(12) United States Patent
Parker et al.

(10) Patent No.: US 7,808,979 B2
(45) Date of Patent: Oct. 5, 2010

(54) METHODS AND SYSTEMS FOR PACKET AGGREGATION COMBINING CONNECTION-ORIENTED AND CONNECTION-LESS TECHNIQUES

(75) Inventors: Ronald M. Parker, Boxborough, MA (US); Fouad Hallal, Worcester, MA (US); Gary A. Sawosik, Littleton, MA (US)

(73) Assignee: Ciena Corporation, Linthicum, MD (US)

( * ) Notice: Subject to any disclaimer, the term of this patent is extended or adjusted under 35 U.S.C. 154(b) by 826 days.

(21) Appl. No.: 11/474,829

(22) Filed: Jun. 26, 2006

(65) Prior Publication Data

US 2007/0299987 A1 Dec. 27, 2007

(51) Int. Cl.
*H04L 12/66* (2006.01)
*H04L 12/28* (2006.01)
*H04J 3/16* (2006.01)

(52) U.S. Cl. .............. 370/353; 370/395.5; 370/401; 370/469

(58) Field of Classification Search ............ None
See application file for complete search history.

(56) References Cited

U.S. PATENT DOCUMENTS

| | | | |
|---|---|---|---|
| 6,181,681 B1 * | 1/2001 | Hiscock et al. | 370/279 |
| 6,771,673 B1 * | 8/2004 | Baum et al. | 370/535 |
| 2004/0037279 A1 * | 2/2004 | Zelig et al. | 370/390 |
| 2005/0018689 A1 * | 1/2005 | Chudoba | 370/395.5 |
| 2005/0141504 A1 * | 6/2005 | Rembert et al. | 370/392 |

* cited by examiner

*Primary Examiner*—Gregory B Sefcheck
*Assistant Examiner*—Nima Mahmoudzadeh
(74) *Attorney, Agent, or Firm*—Clements Bernard PLLC; Christopher L. Bernard; Lawrence A. Baratta, Jr.

(57) ABSTRACT

The present invention provides methods and systems for aggregating packets combining connection-oriented and connection-less techniques. The methods and systems of packet aggregation utilize connection-oriented techniques to forward data from multiple clients to an access switch and utilize connection-less techniques to forward data from the access switch to the multiple clients. Advantageously, the methods and systems of the present invention combine connection-oriented and connection-less aggregation techniques in a packet aggregation platform to provide for a well-understood per-subscriber provisioning model, to maintain per-subscriber visibility, to allow layer 2 protocol internetworking, to remove connection count limitations imposed by adjacent equipment, and to maintain security aspects of connection-oriented aggregation techniques.

18 Claims, 8 Drawing Sheets

METHODS AND SYSTEMS FOR PACKET AGGREGATION COMBINING CONNECTION-ORIENTED AND CONNECTION-LESS TECHNIQUES

FIELD OF THE INVENTION

The present invention relates generally to the telecommunications and networking fields. More specifically, the present invention relates to methods and systems for combining connection-oriented and connection-less techniques for packet aggregation between clients and an access switch. Advantageously, the methods and systems of the present invention combine connection-oriented and connection-less aggregation techniques in a packet aggregation platform to provide for a well-understood per-subscriber provisioning model, to maintain per-subscriber visibility, to allow layer 2 protocol internetworking, to remove connection count limitations imposed by adjacent equipment, and to maintain security aspects of connection-oriented aggregation techniques.

BACKGROUND OF THE INVENTION

Packet switched network (PSN) aggregation platforms are operable to aggregate Ethernet, Internet protocol (IP), multi-protocol label switching (MPLS), asynchronous transfer mode (ATM), frame relay, and time division multiplexing (TDM) onto Ethernet and IP/MPLS-based architectures. In one application, a PSN aggregation platform can be used to aggregate data from multiple digital line subscriber loop access multiplexer (DSLAM) end customers to a single broadband remote access server (BRAS).

PSN aggregation such as, for example, digital subscriber loop (DSL) aggregation, broadband cable Internet aggregation, and passive optical network (PON) aggregation, is typically handled via either connection-oriented or connection-less aggregation techniques. Examples of connection-oriented aggregation techniques include asynchronous transfer mode (ATM) cross-connect, virtual local area network (VLAN) cross-connect, and frame relay cross-connect. Examples of connection-less aggregation techniques include IEEE 802.1 d/802.1 q Ethernet media access control (MAC) bridging.

Both connection-oriented and connection-less aggregation techniques have relative strengths and weaknesses. Advantageously, connection-oriented aggregation techniques maintain per subscriber visibility, include a well-understood per-subscriber subscription model, provide enhanced security, and allow for layer 2 protocol internetworking such as ATM to Ethernet. Conversely, connection-oriented techniques require a large amount of provisioning and may be limited with respect to the number of connections, especially for Ethernet VLANs. Advantageously, connection-less techniques provide for a simple port-level provisioning model. Conversely, connection-less techniques do not maintain per-subscriber visibility, provide for simple layer 2 protocol internetworking, or provide for strong security.

Existing client devices (e.g. DSLAMs) typically utilize ATM to connect to an aggregation platform. For example, a multi-service switch (MSS) can be used as an aggregation platform. Multi-service switches interface from the customer service area to a service provider's network. A typical MSS includes both an ATM and an MPLS control plane. Further, a MSS includes multi-service interfaces such as OC-48c/OC-12c/OC-3c ATM and packet-over SONET (POS), ATM interfaces such as DS-3, E3, OC-3, DS-1, etc., frame relay/IP interfaces such as OC-3, DS-3, etc., and Ethernet interfaces such as 10/100 BaseT and gigabit Ethernet.

In typical deployments of MSS as aggregation platforms, client devices connect through ATM interfaces to the MSS. The MSS aggregates the clients onto a single port which is connected to an access switch. For example, the client devices can include DSLAMs connected by ATM to the MSS and the access switch can include a BRAS connected to the MSS by ATM or Ethernet. Typically, existing access switch and client devices both connect to the MSS through ATM. However, service providers are migrating to Ethernet to provide lower cost and more flexibility than ATM.

The migration to Ethernet requires the aggregation platform (e.g. MSS) to aggregate ATM attached client devices to the Ethernet attached access switch. In particular, one technique to migrate from ATM aggregation to Ethernet aggregation is to replace the connection between the aggregation platform and the access switch from ATM to Ethernet while leaving the connection between the client devices and the aggregation device as ATM. Disadvantageously, most of the current Ethernet-attached access switches are incapable of terminating a sufficient number of VLAN IDs to efficiently and economically utilize a pure connection-oriented aggregation technique. Further, this allows for client-to-client communications, which further complicates the provisioning and functionality in a pure connection-less environment. Client-to-client communications also introduce additional security concerns.

Additionally, since most client devices utilize ATM to connect to aggregation platforms, it is impractical to utilize a pure connection-less aggregation technique because aggregation platforms are incapable of terminating very large quantities of ATM virtual circuits (VCs) in order to treat each as a virtual Ethernet bridge port. Furthermore, existing aggregation platforms typical utilize ATM switching capabilities that do not include frame reassembly, i.e. aggregation platforms can only switch ATM at the cell layer.

Thus, methods and systems are needed to assist in migrating existing connection-oriented aggregation platforms to connection-less aggregation techniques and to overcome the limitations of pure connection-oriented aggregation techniques by combining connection-oriented and connection-less aggregation techniques.

BRIEF SUMMARY OF THE INVENTION

In various exemplary embodiments, the present invention combines connection-oriented and connection-less aggregation techniques in a packet aggregation platform to provide for a well-understood per-subscriber provisioning model, to maintain per-subscriber visibility, to allow layer 2 protocol internetworking, to remove connection count limitations imposed by adjacent equipment, and to maintain security aspects of connection-oriented aggregation techniques. The present invention utilizes a "many-to-one" model where aggregation is done with connection-oriented aggregation techniques to forward data from clients (i.e. the "many") to an access switch (i.e. the "one"), and connection-less aggregation techniques to forward data from the access switch to the clients.

In one exemplary embodiment of the present invention, a packet aggregation method for aggregating packets from multiple clients combining connection-oriented and connection-less techniques includes utilizing connection-oriented techniques to forward data from the multiple clients to an access switch; and utilizing connection-less techniques to forward data from the access switch to the multiple clients;

wherein the connection-oriented techniques learn addresses of the multiple clients for use in the connect-less techniques.

In another exemplary embodiment of the present invention, a bridge multiplexer (BMUX) switched permanent virtual circuit (SPVC) which is a variant of an Ethernet virtual private line (EVPL) SPVC operable to support multiple instances with a single VLAN ID includes an access switch endpoint operable to support multiple instances, the access switch endpoint comprises a single VLAN ID; one or more client endpoints comprising ATM endpoints, frame relay endpoints, and Ethernet endpoints, and combinations thereof; one or more virtual circuits between the access switch endpoint and the one or more client endpoints, the one or more virtual circuits are provisioned between the access switch endpoint and the one or more client endpoints; and wherein the one or more client endpoints are switched in a connection-oriented manner to the access switch endpoint, the access switch endpoint is operable to learn the source MAC addresses with respect to a virtual circuit, the virtual circuit comprises the virtual circuit of the one or more virtual circuits that sourced a frame corresponding to the source MAC address; wherein the access switch endpoint is switched in a connection-less manner to the one or more client endpoints, the access switch endpoint forwards data responsive to the learned sourced MAC addresses.

In a further exemplary embodiment of the present invention, an aggregation platform for aggregating packets from multiple clients combining connection-oriented and connection-less techniques includes port adaptors connected to one or more client devices; an Ethernet port adaptor connected to an access switch; forwarding modules connected to the port adaptors and the Ethernet port adaptor, the forwarding modules are configured to: forward data from the port adaptors to the Ethernet port adaptor utilizing connection-oriented techniques; and forward data from the Ethernet port adaptor to the port adaptors utilizing connection-less techniques to forward data from the access switch to the multiple clients; wherein the data comprises an Ethernet MAC frame even when the interface type is non-Ethernet.

In a still further exemplary embodiment of the present invention, a digital subscriber loop (DSL) aggregation method for aggregating packets from multiple DSL access multiplexers (DSLAMs) to a single broadband remote access switch (BRAS) combining connection-oriented and connection-less techniques includes provisioning a virtual circuit between ports of the DSLAMs and a port of the BRAS, the virtual circuit is provisioned for either ATM on the ports of the DSLAMs and Ethernet on the port of the BRAS or for Ethernet on the port of the DSLAMs and Ethernet on the port of the BRAS; learning source MAC addresses with respect to the virtual circuit that sourced a frame as data is switched from the ports of the DSLAMs to the port of the BRAS, the learned source MAC addresses are stored in a table, and the frame comprises a MAC frame with a source MAC address; forwarding the data in a connection-oriented manner to the virtual circuit; looking up destination MAC addresses in the table as data is switched from the port of the BRAS to the ports of the DSLAMs; looking up destination MAC addresses in the table as data is switched from the port of the BRAS to the ports of the DSLAMs; matching a destination MAC address in the data to a destination MAC address in the table, the destination MAC address in the table comprises a corresponding virtual circuit; if a match is found of the destination MAC address in the data, forwarding data on the corresponding virtual circuit; and if no match is found of the destination MAC address in the data, flooding or dropping the data responsive to user provisioning.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention combines connection-oriented and connection-less techniques to provide for packet aggregation with a well-understood per-subscriber provisioning model, maintaining per-subscriber visibility, allowing layer 2 protocol internetworking, removing connection count limitations imposed by adjacent equipment, and maintaining security aspects of connection-oriented techniques. The present invention utilizes a "many-to-one" model where aggregation is done with connection-oriented techniques to forward data from the many side (e.g., clients) to the one side (e.g., an access switch) and connection-less techniques to forward data from the one side to the many side.

Figure 1:
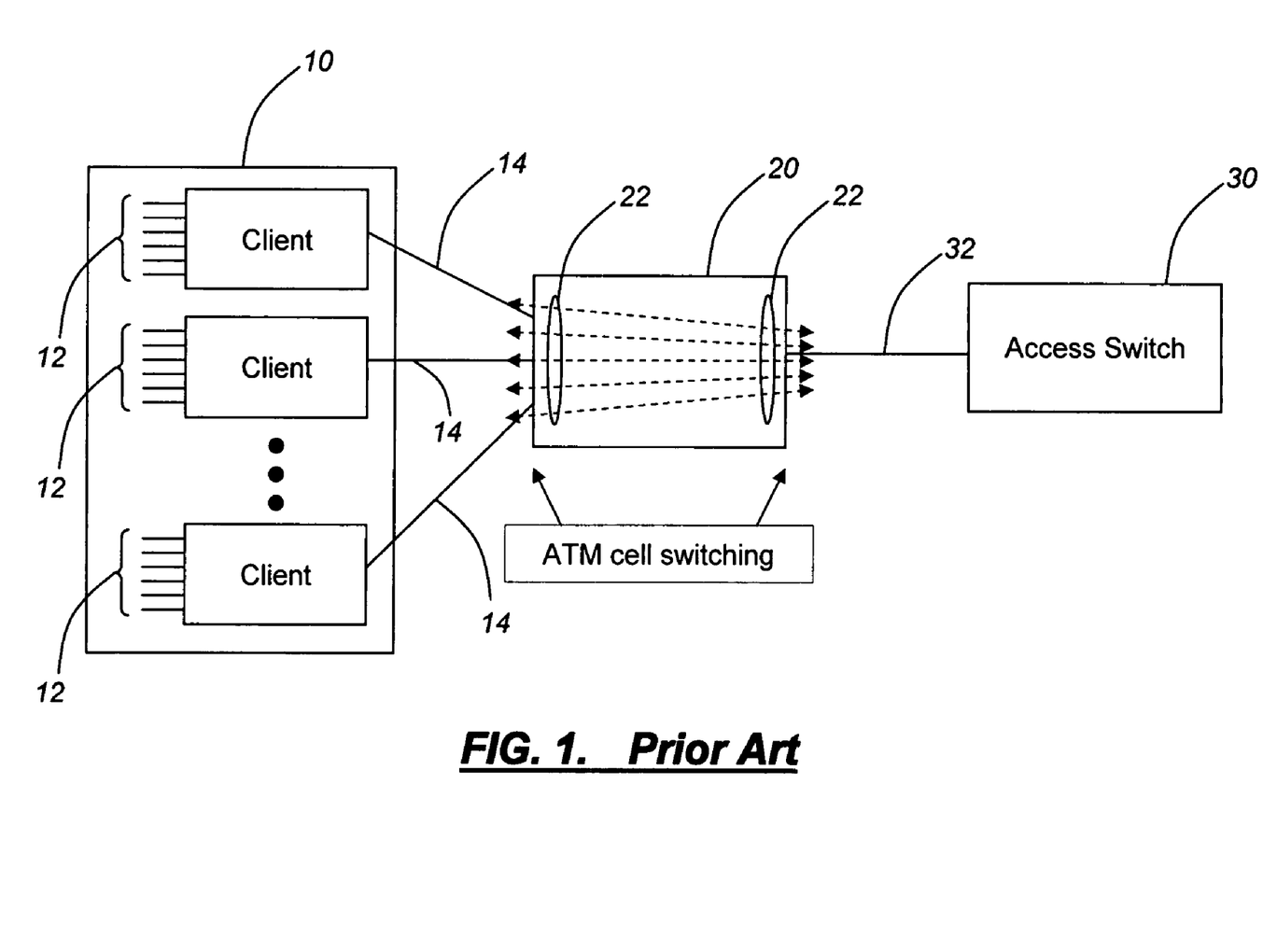
FIG. 1 is a schematic diagram illustrating how, using conventional methods and systems, multiple client devices may be connected to an access switch utilizing an aggregation platform.

Referring to FIG. 1, an example of conventional methods and systems of client aggregation utilizes connection-oriented techniques such as ATM to aggregate multiple clients 10 to a single access switch 30. The multiple clients 10 connect to an aggregation platform 20 with each client 10 having a connection 14 to the aggregation platform 20. Conventionally, the connections 14 between the clients 10 and the aggregation platform 20 are ATM connections. Additionally, the connections 14 between the clients 10 and the aggregation platform 20 may include Ethernet connections. The clients 10 can be co-located or physically diverse from the aggregation platform 20. Further, the connections 14 between the clients 10 and the aggregation platform 20 can include optical links such as OC-3c and OC-12c or electrical links. Additionally, each client 10 provides customer interfaces 12 which can include data traffic such as, for example, Internet Protocol (IP), Point-to-Point Protocol (PPP), Point-to-Point Protocol over Ethernet (PPPoE), Ethernet, and ATM.

The clients 10 can include digital line subscriber loop access multiplexers (DSLAMs). A DSLAM is a network device, usually located at a telephone company central office, or within a neighborhood service area as part of a digital loop carrier, that receives signals from multiple customer digital subscriber line (DSL) connections and aggregates the signals on a high-speed backbone line using multiplexing techniques (e.g. ATM or Ethernet). Conventionally, DSLAM multiplexers connect DSL lines with ATM, but additionally can utilize frame relay or Ethernet. The line cards in the DSLAM are operable to connect to the aggregation platform 20 through the connections 14.

The aggregation platform 20 is operable to aggregate the multiple clients 10 to the single access switch 30. The aggregation platform 20 includes a switching fabric, client ports, and a network port. Conventionally, the switching fabric of the aggregation platform 20 is operable to perform ATM cell switching 22 to aggregate the multiple clients 10 to the access switch 30. Specifically, the client ports and the network port of the aggregation platform are configured to support ATM connections.

The access switch 30 can be a broadband remote access switch (BRAS). The access switch 30 is the last IP aware device between a service provider's network and the clients 10, i.e. the access switch 30 connects to an external network such as the Internet. The access switch 30 can provide aggregation capabilities such as for IP, PPP, and ATM between the regional and access network and the service provider's network. Additionally, the access switch is the injection point for policy management and IP quality-of-service (QoS) in the regional/access networks.

The aggregation platform 20 conventionally connects to the access switch 30 with an ATM connection 32. In the example of FIG. 1, both the connections 14, 32 utilize the connection-oriented techniques of ATM. The connections 14, 32 provide for per subscriber visibility, a well-understood connection provisioning model, and enhanced security. However, ATM connections 14, 32 require large amounts of provisioning and can be limited by the number of connections.

Figure 2:
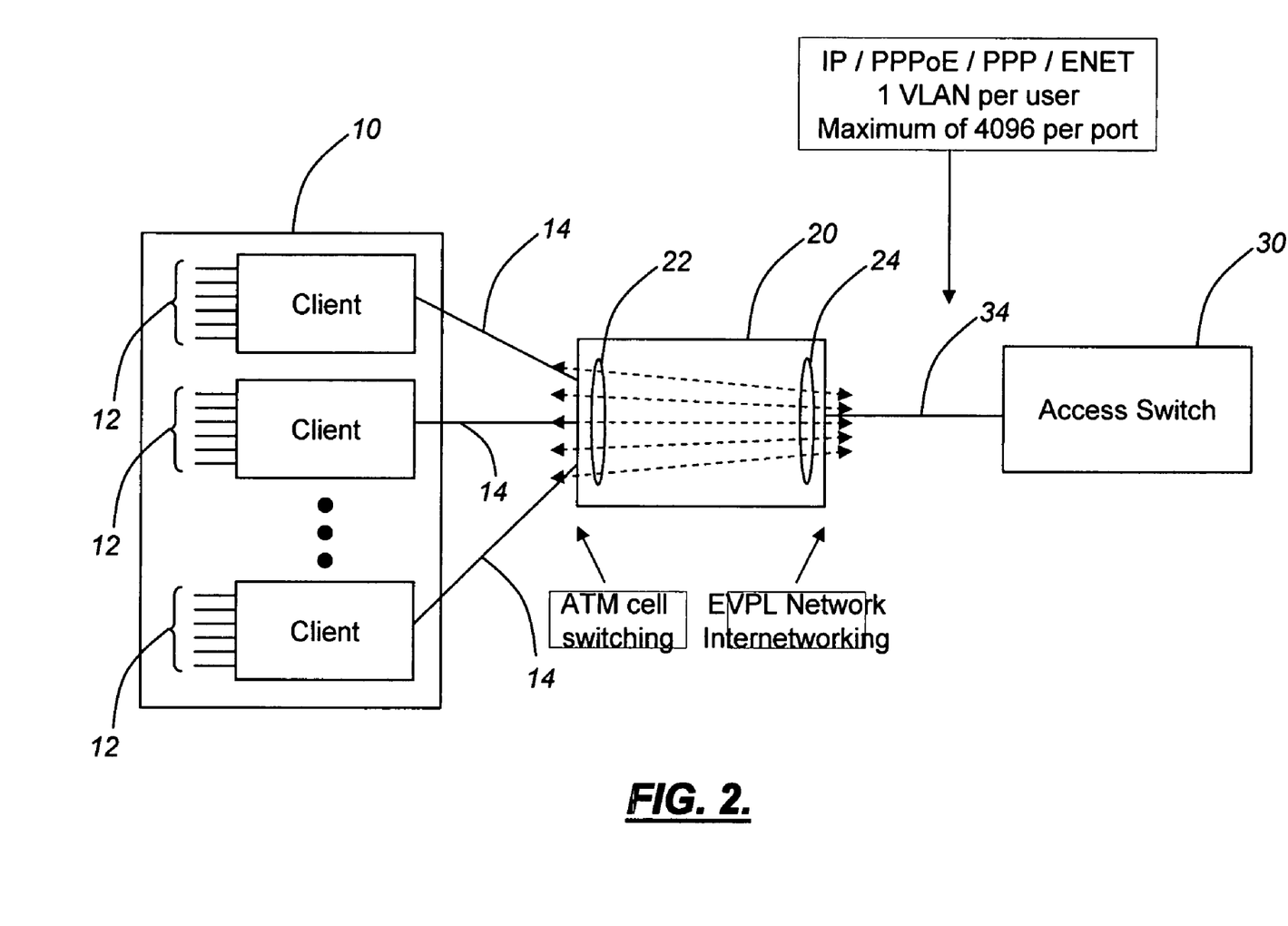
FIG. 2 is a schematic diagram illustrating a migration of the connection between the access switch to the aggregation platform to Ethernet.

Referring to FIG. 2, conventional methods and systems of client aggregation are migrating to an Ethernet connection 34 between the aggregation platform 20 and the access switch 30. Here, the connection 34 between the aggregation platform 20 and the access switch 30 is an Ethernet virtual private line (EVPL) 24. The aggregation platform 20 provides ATM cell switching 22 on the client connections 14 to EVPL 24 on the access switch connection 24. Here, the access switch 30 is connected with an Ethernet adaptor as well such as a gigabit Ethernet adaptor to the aggregation platform 20.

EVPL supports service multiplexed user network interface (UNI) and point-to-point services for site interconnectivity. The EVPL is an Ethernet port which is divided into multiple flows using tagging. Up to 4096 flows per Ethernet port can be configured. The Ethernet connection 34 requires that each virtual path identifier (VPI) and virtual circuit identifier (VCI) from the clients 10 is assigned a unique VLAN ID. Thus, the maximum number of VLANs support on Ethernet port adaptors is limited to 4096 which is insufficient to support large numbers of end-customer circuits that are typically aggregated on the aggregation platform 20. Unlike ATM, where a virtually unlimited number of connections could be passed from the aggregation platform 20 to the access switch 30, using VLAN IDs limits the number of connections (e.g., end users) to 4096 per access switch 30. This limitation is significant in migrating to an Ethernet attached access switch 30 with clients 10 connecting to the aggregation platform 20 with ATM.

Figure 3:
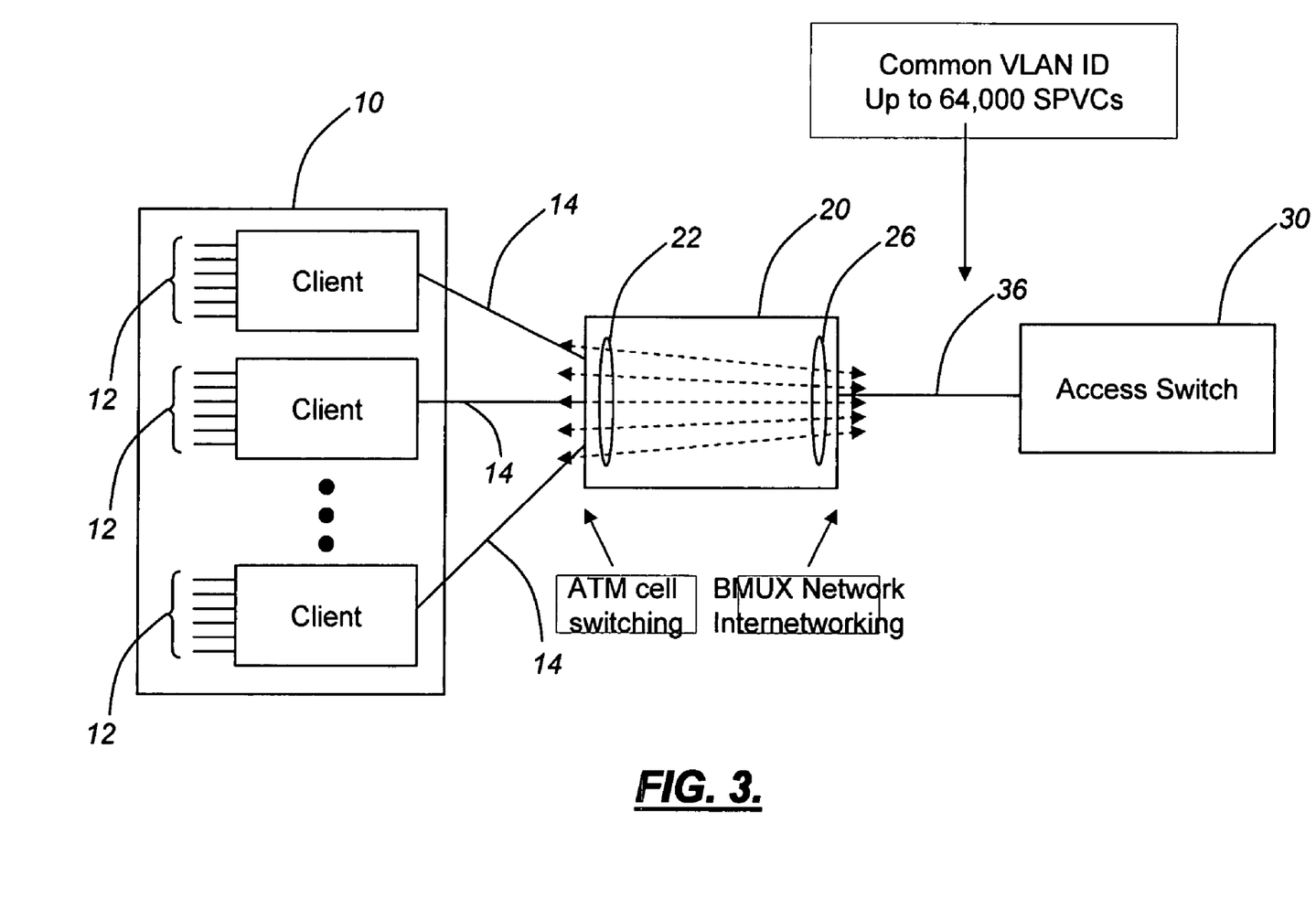
FIG. 3 is a schematic diagram illustrating how, using the present invention, multiple client devices can be connected to an access switch utilizing an aggregation platform operable to combine connection-oriented and connection-less techniques to perform aggregation.

Referring to FIG. 3, the present invention provides methods and systems of client aggregation utilizing connection-oriented and connection-less techniques through the aggregation platform 20. The aggregation platform 20 in the present invention provides for connection-oriented techniques to forward data from the clients 10 to the access switch 30 and for connection-less techniques to forward data from the access switch 30 to the clients 10. This removes the 4096 connection limitation in the example of FIG. 2 by multiplexing VPI/VCIs from the clients 10 onto a single VLAN on the access switch 30 connection 36 from the aggregation platform.

Here in FIG. 3, the clients 10 remain connected to the aggregation platform 20 through ATM connections 14 while the access switch 30 connection 36 to the aggregation platform 20 is migrating to Ethernet. The connection 36 between the aggregation platform 20 and the access switch 30 can include a simple Ethernet connection or a Link Aggregation Group (LAG) as defined in IEEE 802.3ad, which is hereby incorporated by reference.

The aggregation platform 20 includes a fabric to switch the ATM cell switching 22 to an EVPL with a single VLAN at the access switch 30 side. The present invention augments the simple EVPL-network interface (NI) cross-connect model by performing a merge/de-merge (i.e., multiple/demultiplex) at the access switch 30 connection 36. Multiple ATM VPI/VCIs from the clients 10 are multiplexed onto a single VLAN (or an untagged VLAN) at the access switch 30 connection 36. During this multiplexing process, the source MAC addresses are learned and associated with the appropriate ATM VPI/VCI from the clients 10. Aging, as described in IEEE 802.1d bridging which is hereby incorporated by reference, is performed on these learned source MACs. The learned source MAC addresses are stored in a learned address table. When demultiplexing (i.e., from the access switch 30 to the clients 10), the learned address table is consulted in order to determine which SPVC the datagram shall be progressed on.

This approach, however, creates a new problem for the access switch 30. In FIG. 1, the access switch 30 can identify the client 10 by the ifNum/vpi/vci that the data arrives on. In FIG. 2, the access switch 30 can identify the client 10 by the ifNum/vlanId that the data arrives on. But in FIG. 3, there is no way for the access switch 30 to determine the client 10. To solve this problem, the DSL Forum's WT-101 "Migration to Ethernet Based DSL Aggregation"(available from the DSL Forum of Freemont, Calif.), which is hereby incorporated by reference, introduces the PPPoE Intermediate Agent functionality. PPPoE Intermediate Agent functions in a manner similar to that of Dynamic Host Configuration Protocol (DHCP) relay by snooping the session establishment packets from the client 10 towards the access switch 30 and inserting optional fields that identifies the client's 10 location. This functionality can be incorporated into the present invention to maintain the identification of the clients 10. Thus, even though the access switch 30 is not able to identify clients 10 via a link identifier layer (i.e. VLAN ID), the switch 30 is able to match the PPP over Ethernet session to a client 10.

DSL Forum WT-101 also discusses security issues. Specifically, the issue of MAC address spoofing is covered. It is desirable to guard against malicious users that attempt to gain service for themselves or to deny service to others by spoofing legitimate source MACs owned by other stations. The present invention can support an option to disable "relearning". When relearning is enabled (typical bridging behavior), the last place a source MAC is seen is always the current location for that source MAC. When relearning is disabled, if a source MAC that is already known is observed at a new location, the packet will be dropped, thereby preventing the relearn.

Figure 4A:
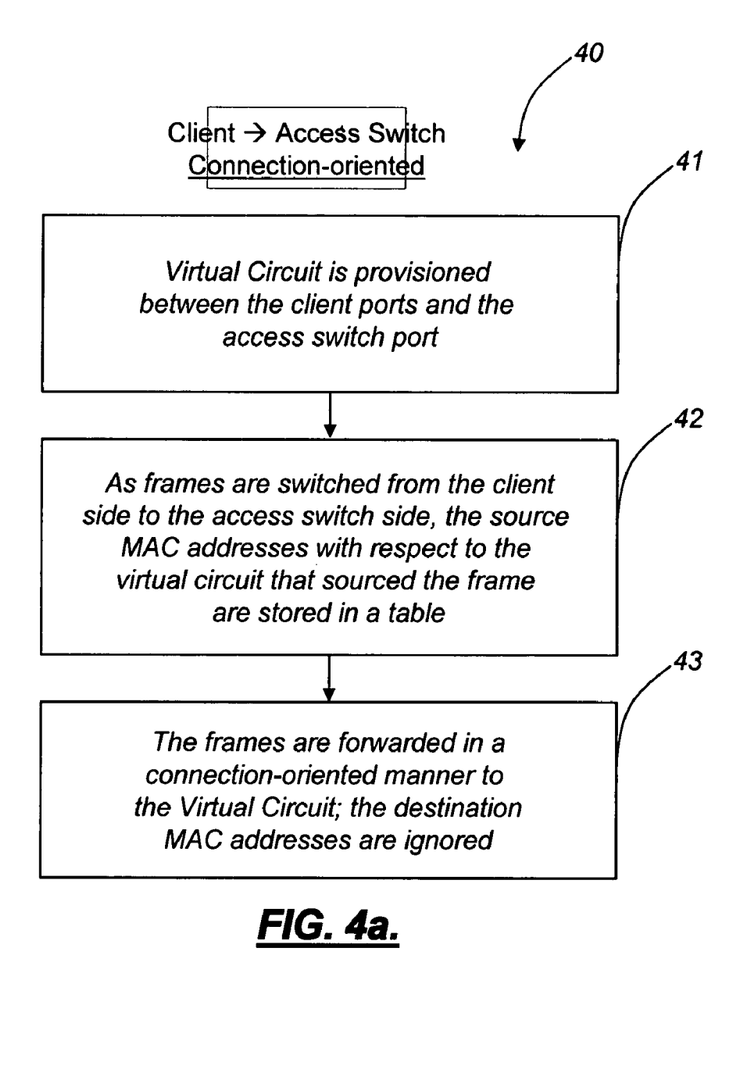
FIGS. 4a-b are flowcharts illustrating an exemplary embodiment of the present invention to combine connection-oriented and connection-less techniques to perform packet aggregation.
Figure 4B:
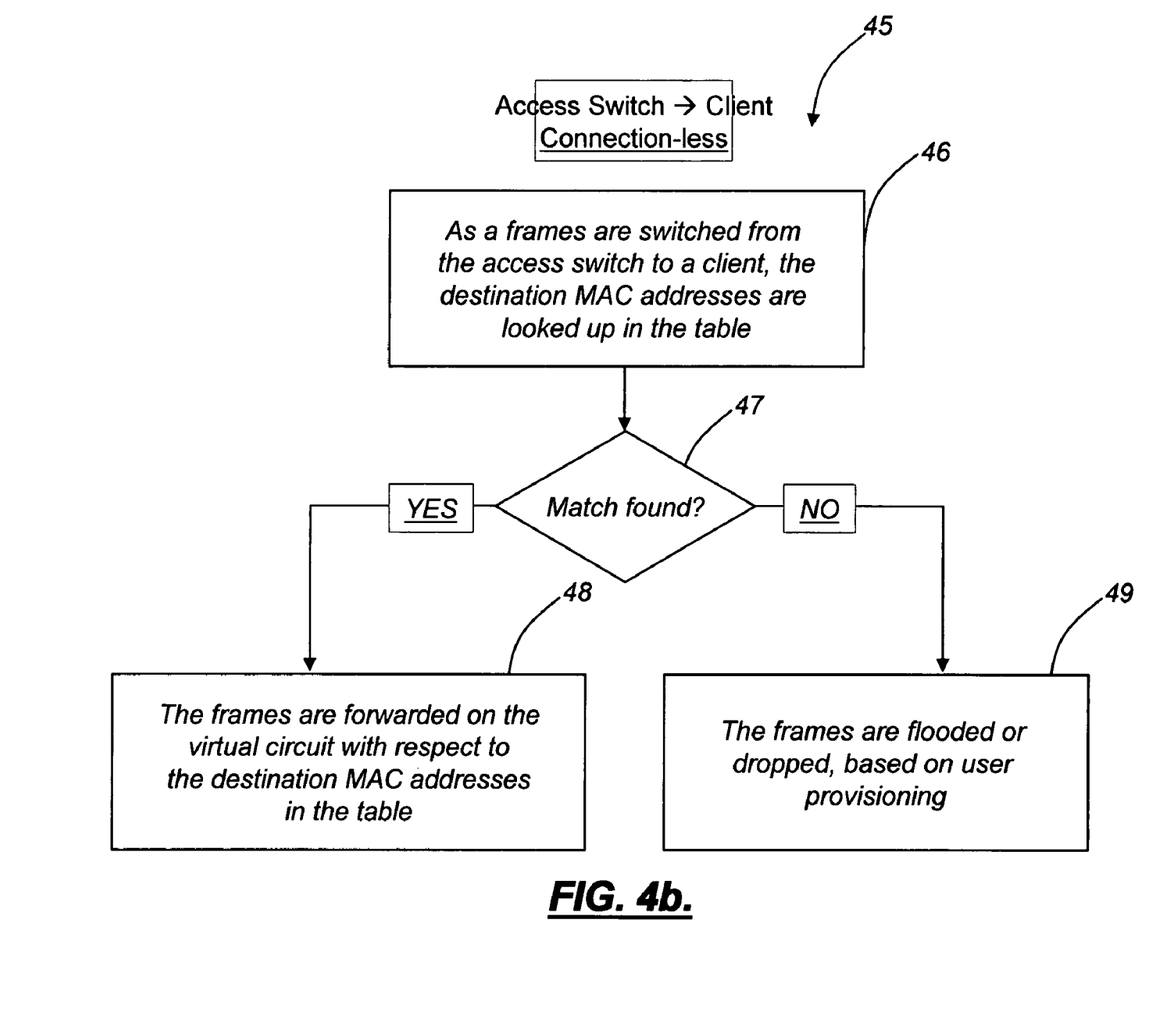

FIGS. 4a-b are flowcharts illustrating exemplary embodiments of the present invention for packet aggregation including the client to access switch forwarding 40 and the access switch to client packet forwarding 45. The present invention provides that connection-oriented techniques are utilized to forward data from clients to an access switch and connectionless techniques to forward data from the access switch to the clients. More specifically, the techniques of the present invention can be referred to as "half-bridging", noting that this technique assumes that the user data contains an Ethernet MAC frame even when the interface type is non-Ethernet, such as ATM.

Referring to FIG. 4a, the client to access switch forwarding 40 begins with provisioning a virtual circuit between the client ports and the access switch port (block 41). This virtual circuit can be provisioned for interworking (e.g., ATM on the client side and Ethernet on the access switch side) or for non-interworking layer 2 cross-connect (e.g. Ethernet on the client side and on the access switch side). For Ethernet interfaces, the use of VLAN IDs is optional. When switching from non-Ethernet (on the client side) to Ethernet (on the access switch side), then the non-Ethernet interfaces must be carrying Ethernet encapsulated in the native link layer. For example, for ATM SPVCs (e.g., from a DSLAM), the data is Ethernet over AAL5, as described by RFC 2684 (Multi-protocol Encapsulation over ATM AAL5) which is hereby incorporated by reference. There is a similar RFC that describes Ethernet over Frame Relay (RFC2427), which is hereby incorporated by reference.

As data is switched from the client side to the access switch side, the source MAC addresses with respect to the virtual circuit that sourced the frame are learned and stored in a table (block 42). The period for learning the source MAC addresses is known as the aging period, and the aging period is a user customizable setting. The frame is forwarded in a connection-oriented manner to the virtual circuit, and the destination MAC addresses are ignored (block 43). Many of the virtual circuits will share the same outgoing virtual circuit endpoint. If an optional VLAN ID is utilized, then all of the outgoing virtual circuit endpoints will utilize the same outgoing VLAN ID. As is typical of connection-oriented techniques, statistics are maintained per virtual circuit, even though the outgoing virtual circuit endpoint is indistinguishable amongst the multiple virtual circuits.

Referring to FIG. 4b, the access switch to client forwarding 45 begins as data is switched from the access switch to a client, the destination MAC addresses are looked up in the table (block 46). If a match is found (block 47), then the frame is forwarded on the virtual circuit with respect to the destination MAC addresses in the table (block 48). If no match is found (block 47), then the frame is flooded or dropped based on user provisioning (block 49).

Figure 5:
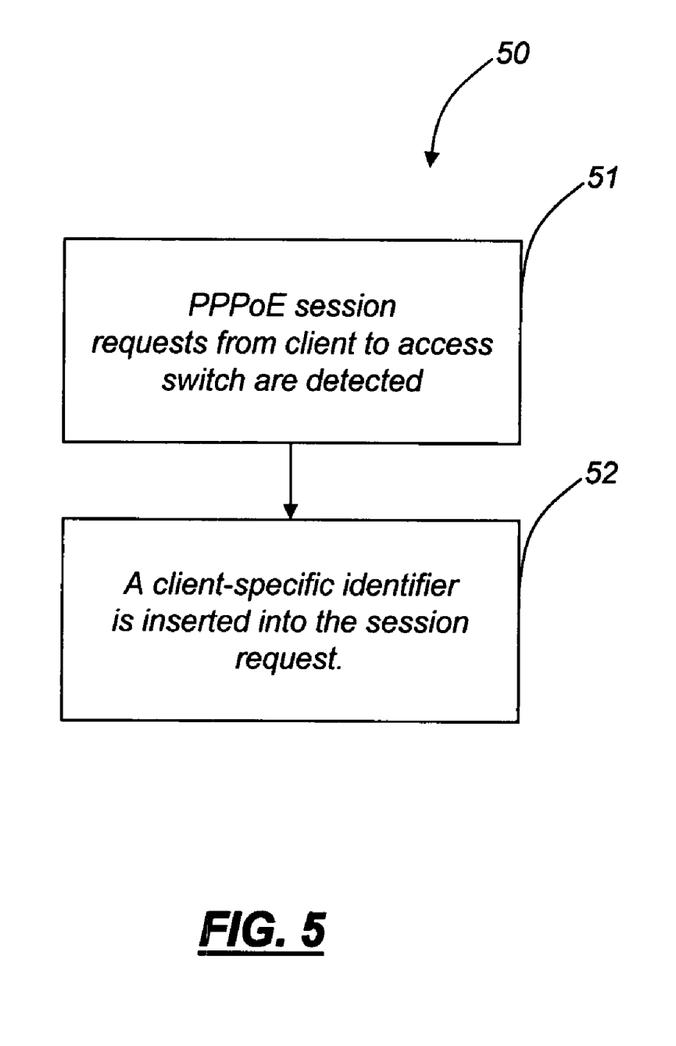
FIG. 5 is a flowchart illustrating an exemplary embodiment of the present invention for using PPPoE Intermediate Agent to maintain per-client visibility through an aggregation platform to an access switch.

FIG. 5 is a flowchart illustrating an exemplary embodiment of the present invention for using PPPoE Intermediate Agent to maintain per-client visibility through an aggregation platform to an access switch. In the present invention, the aggregation platform maintains full per-client visibility through the use of the virtual circuit provisioning and switching model. However, the access switch may not have such visibility because each client is provided to the access switch without a unique link layer connection identifier, i.e. all virtual circuits map to the same VLAN ID. The DSL Forum WT-101 includes a capability, PPPoE Intermediate Agent, which overcomes this limitation in cases where PPPoE encapsulation is used such as DSL where PPPoE is commonly used.

Referring to FIG. 5, an aggregation platform detects PPPoE session requests from a client to an access switch (block 51). Session requests include session establishment, confirmation and termination packets sent from the client to the access switch. Example session requests include PPPoE active discovery initiation packet (PADI), PPPoE active discovery offer packet (PADO), PPPoE active discovery request packet (PADR), PPPoE active discovery session-confirmation packet (PADS), and PPPoE active discovery terminate packet (PADT). When detected, a client-specific identifier is inserted into the session request (block 52). The client-specific identifier can include the client's virtual path identifier/virtual channel identifier (VPI/VCI), data link connection identifier (DLCI), or virtual local area network identifier (VLAN ID). The format of the specific identifier is provided for in WT-101. The access switch is operable to identify a client by matching the PPPoE session to the client instead of using the VLAN ID.

Figure 6:
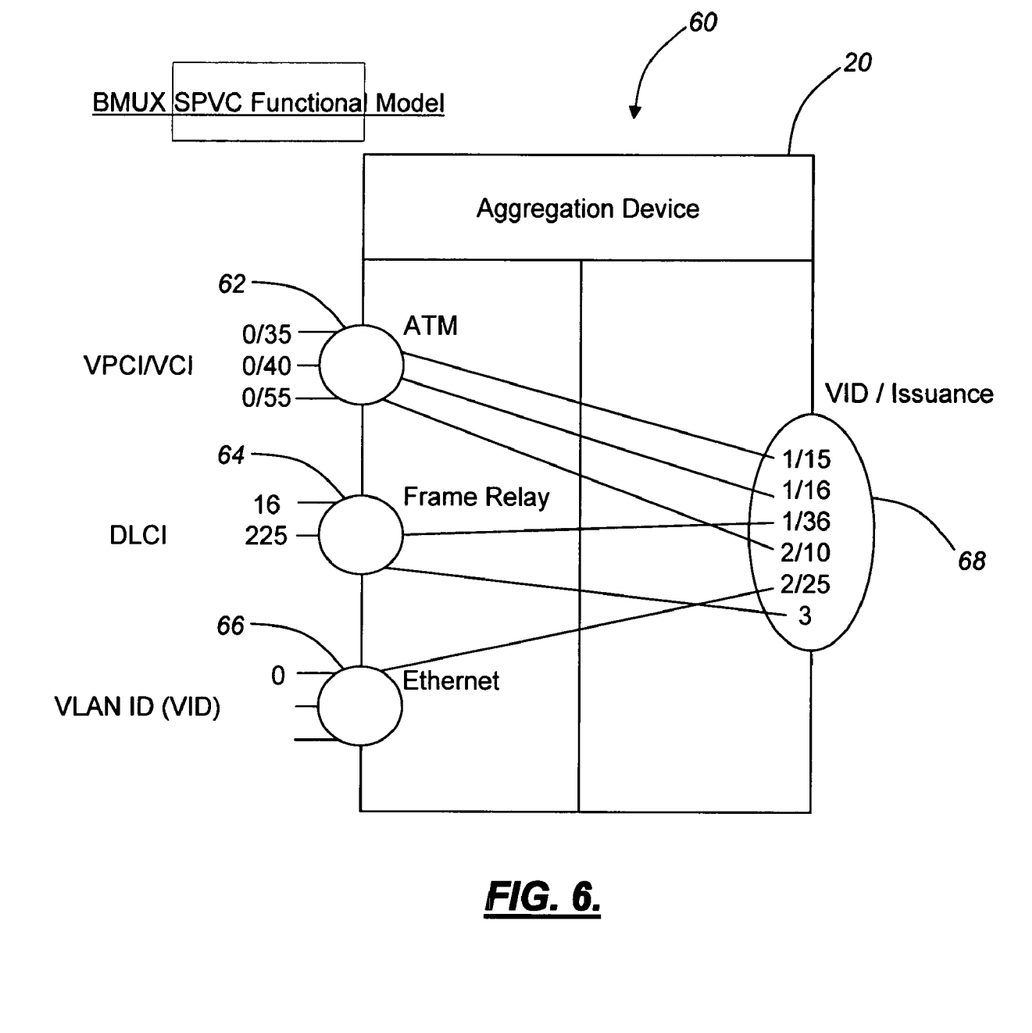
FIG. 6 is a functional model of the present invention illustrating an exemplary single switch configuration with Ethernet Lports supporting a mix of ATM, frame relay, and Ethernet endpoints into a bridge multiplexer (BMUX) end point.

Referring to FIG. 6, functional model 60 illustrates a single switch configuration with Ethernet Lport supporting a mix of ATM 62, frame relay 64, and Ethernet 66 endpoints into a bridge multiplexer (BMUX) 68 end point. An Lport is the logical access port for all circuits originating and terminating on a node. Two types of Lports include direct Lports which is a defined pools of VPIs and VCIs and virtual Lports which are assigned a specific VPI value and range of VCIs.

The BMUX 68 is a switched permanent virtual circuit (SPVC) similar to the existing Ethernet virtual private line (EVPL) SPVC which provides the ability to support multiple instances that support a single VLAN ID. The BMUX 68 SPVC is a new variant of the existing EVPL SPVC which can be described as a MAC Address learning SPVC. Each instance is treated as an independent SPVC and there could be up to a fixed number of instances per VLAN ID significantly greater than the 4096 using traditional methods.

The functional model 60 can be seen as a "Many to One" model with the BMUX 68 endpoint represented on the "One" side with a single VLAN ID and the ability to support multiple instances. Each SPVC shares the same VLAN ID, but an arbitrary index known as an instance ID is used to distinguish each SPVC in the same VLAN ID. The "Many" side could be any of ATM 62, Frame Relay 64, or Ethernet 66 (EVPL or Ethernet Private Line (EPL)) end points. The switching of the "Many to One" connections could performed single switch, or multi-hop. Multi-hop signaling techniques could include MPLS, ATM PNNI, and others.

In the direction from the "Many to One", ATM 62 and frame relay 64 SPVC end points function unchanged without knowledge that they are part of a BMUX 68 endpoint. BMUX 68 endpoints behave as a typical EVPL SPVC (i.e., provisioned as a frame relay SPVC under an Ethernet Lport), with one exception. In an exemplary embodiment of the present invention, as the packets are reassembled from a fabric, the source MAC address is looked up in a table. If the source MAC address is unknown, the packet is internally multicast to the CPU's capture queue and to the normal egress queue. If the source MAC is found in the table, the packet is forwarded to the normal egress queue. If the source MAC is known, but against a different SPVC instance, then it must be "relearned". Relearning is a user configurable setting which can be enabled or disable to allow the source MAC to be relearned in the table against the latest SPVC instance. If it is disabled, then the packet is counted and discarded.

In the direction from the "One to Many", the BMUX 68 SPVCs function as a simple bridge with a single filtering database ID (FID). When a packet is received from the line, its destination MAC address is examined. If the destination MAC address is broadcast or multicast, the packet is dropped and counted. If the destination MAC address is unicast, it is looked up in the table of learned MAC addresses. If the destination MAC address is unknown, the packet is dropped and counted or the packet is flooded based on user provisioning. If the destination MAC address is known, then the packet is forward of the appropriate BMUX 68 SPVC.

In FIG. 6 for VLAN ID 1, group instances 15 and 16 of the BMUX 68 endpoint are inter-worked with the ATM 62 endpoints and instance 36 is inter-worked with the frame relay 64 endpoint. For VLAN ID 2, group instance 10 is inter-worked with the ATM 62 endpoint and instance 25 is inter-worked with the Ethernet 66 end point. For VLAN ID 3 includes the Ethernet 66 endpoint Lport.

A functional summary of the BMUX SPVC includes support for BMUX SPVCs on Ethernet Lports or LAG based Lports. Support for ATM, frame relay, EPL and EVPL end points. The ATM includes channel switched virtual channel connections (VCC) which include switched virtual connections (SVCs) and soft permanent virtual connections (SPVCs). Further, the BMUX SPVC supports layer 2 SPVCs including single-switch, multi-hop PNNI network, MPLS PNNI overlay configurations, and native MPLS with targeted LDP as the network signaling protocol.

Statistics can be maintained for both the BMUX 68 SPVC and the ATM 62, frame relay 64, and Ethernet 66 endpoints. For example, statistics for the BMUX 68 SPVC can include the number of addresses aged out, number of addresses relearned, number of rejected address learns, number of dropped broadcast frames, number of dropped multicast frames, and number of dropped frames with unknown destination MAC addresses. The statistics for the ATM 62, frame relay 64, and Ethernet 66 endpoints vary depending on the type of endpoint. These statistics include the typical statistics included with ATM 62, frame relay 64, and Ethernet 66.

Figure 7:
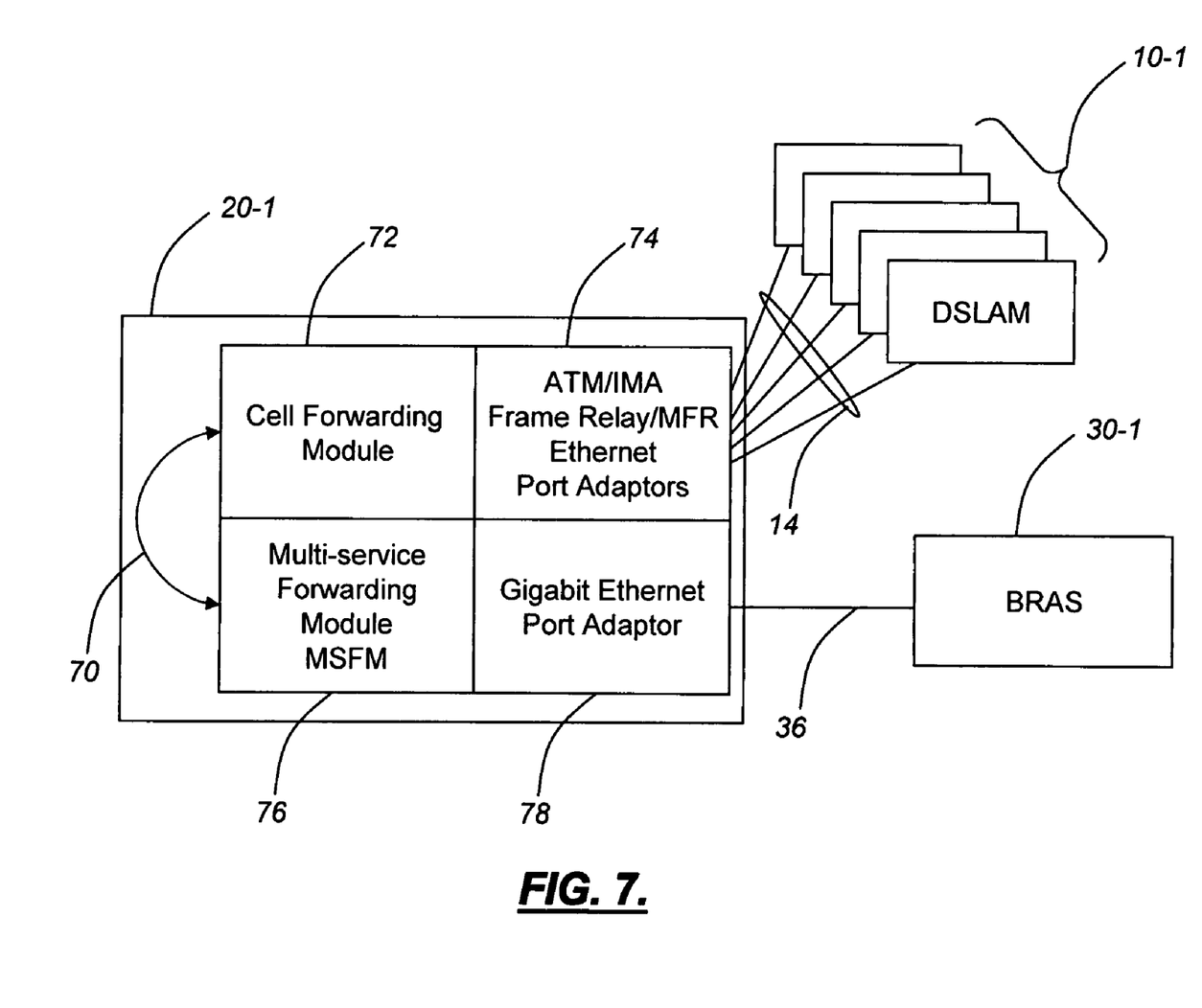
FIG. 7 is an exemplary embodiment of an aggregation platform of the present invention is operable to aggregate multiple into a single BRAS.

Referring to FIG. 7, an exemplary embodiment of an aggregation platform 20-1 of the present invention is operable to aggregate multiple DSLAMs 10-1 into a single BRAS 30-1. The aggregation platform 20-1 is a multi-service edge switching and aggregation platform operable to run in Ethernet, IP/MPLS, and/or ATM modes. The aggregation platform 20-1 supports interface types that scale from DS0 to OC-48 as well as 10/100 BaseT and gigabit Ethernet.

The aggregation platform 20-1 includes forwarding modules 72, 76 which are network cards that forward and switch traffic to port adaptors 74, 78 which provide service interfaces. The aggregation platform includes a cell forwarding module 72 which supports cell bandwidth up to OC-12c and a multi-service forwarding module (MSFM) 76 which supports packet bandwidth up to OC-48c, and the forwarding modules connect through a connection 70 which can include a backplane or a bus connection. The MSFM 76 provides layer 2 and layer 3 any-service, any-port forwarding and processing capabilities, traffic management and local switching functionality, including simultaneous support for IP/MPLS and ATM/PNNI control planes. A gigabit Ethernet port adaptor 78 interfaces to the BRAS 30-1 and the aggregation platform 20-1. A multi-service port adaptor 74 interfaces to multiple DLSAMs 10-1 through ATM, frame relay, or Ethernet connections.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A packet aggregation method for aggregating packets from multiple clients combining connection-oriented and connection-less techniques, the packet aggregation method comprising:

utilizing connection-oriented techniques to forward data from multiple clients to an access switch using a layer 2 protocol, comprising:

provisioning a virtual circuit between ports of the multiple clients and a port of the access switch;

learning source media access control addresses with respect to the virtual circuit that sourced the frame as data is switched from the ports of the multiple clients to the port of the access switch, the learned source media access control addresses are stored in a table; and forwarding the data in a connection-oriented manner to the virtual circuit;

utilizing connection-less techniques to forward data from the access switch to the multiple clients using a layer 2 protocol, comprising:

looking up destination media access control addresses in the table as data is switched from the port of the access switch to the ports of the multiple clients and matching a destination media access control address in the data to a destination media access control address in the table, the destination media access control address in the table comprises a corresponding virtual circuit; and if a match is found of the destination media access control address in the data, forwarding data on the corresponding virtual circuit, and, if no match is found of the destination media access control address in the data, flooding or dropping the data responsive to user provisioning;

wherein the connection-oriented techniques learn addresses of the multiple clients for use in the connection-less techniques; and utilizing an intermediate aggregation platform between the multiple clients and the access switch comprising a switch fabric and performing a multiplex/demultiplex at an access switch connection.

2. The packet aggregation method of claim 1, wherein the virtual circuit is provisioned for either asynchronous transfer mode on the ports of the multiple clients and Ethernet on the port of the access switch or for Ethernet on the port of the multiple clients and Ethernet on the port of the access switch.

3. The packet aggregation method of claim 2, wherein aging is performed on the source media access control addresses in the learning step.

4. The packet aggregation method of claim 2, wherein the learning step is operable to relearn source media access control addresses, relearning comprises updating the table each time a source media access control address changes.

5. The packet aggregation method of claim 4, wherein relearning is capable of being disabled.

6. The packet aggregation method of claim 2, further comprising the steps of:

detecting point-to-point protocol over Ethernet session requests, the session requests comprise any of session establishment, confirmation and termination packets; and inserting a client-specific identifier into the session request, the client specific identifier comprises any of a client's virtual path identifier/virtual channel identifier, data link connection identifier, or virtual local area network identifier.

7. The packet aggregation method of claim 1, wherein the ports of the multiple clients comprise asynchronous transfer mode, frame relay, Ethernet, and combinations thereof and the port of the access switch comprise Ethernet or a link aggregation group.

8. A bridge multiplexer switched permanent virtual circuit which is a variant of an Ethernet virtual private line switched permanent virtual circuit operable to support multiple instances with a single virtual local area network identifier, the bridge multiplexer switched permanent virtual circuit comprising:
   an access switch endpoint operable to support multiple instances, the access switch endpoint comprises a single virtual local area network identifier;
   one or more client endpoints comprising asynchronous transfer mode endpoints, frame relay endpoints, and Ethernet endpoints, and combinations thereof;
   one or more virtual circuits between the access switch endpoint and the one or more client endpoints, the one or more virtual circuits are provisioned between the access switch endpoint and the one or more client endpoints;
   wherein the one or more client endpoints are switched in a connection-oriented manner to the access switch endpoint for data transmission using a layer 2 protocol, the access switch endpoint is operable to learn the source media access control addresses with respect to a virtual circuit, the virtual circuit comprises the virtual circuit of the one or more virtual circuits that sourced a frame corresponding to the source media access control address;
   wherein the access switch endpoint is switched in a connection-less manner to the one or more client endpoints for data transmission using a layer 2 protocol by looking up destination media access control addresses in a table as data is switched from the access switch endpoint to the one or more client endpoints, matching a destination media access control address in the data to a destination media access control address in the table, the destination media access control address in the table comprises a corresponding virtual circuit, and, if a match is found of the destination media access control address in the data, forwarding data on the corresponding virtual circuit, and, if no match is found of the destination media access control address in the data, flooding or dropping the data responsive to user provisioning; and
   an intermediate aggregation platform between the one or more client endpoints and the access switch endpoint comprising a switch fabric for performing a multiplex/demultiplex at an access switch point connection.

9. The bridge multiplexer switched permanent virtual circuit of claim 8, further comprising a table of media access control addresses and virtual circuits, the learned source media access control addresses and the virtual circuit that sourced the learned source media access control address are stored in the table.

10. The bridge multiplexer switched permanent virtual circuit of claim 9, wherein the access switch endpoint forwards a frame on the virtual circuit corresponding to the source media access control address in the table.

11. The bridge multiplexer switched permanent virtual circuit of claim 10, wherein the learned source media access control addresses are operable to be relearned if a source media access control address in the table is found, but against a different virtual circuit, the relearning comprises updating the table with the different virtual circuit.

12. The bridge multiplexer switched permanent virtual circuit of claim 11, further comprising:
   access switch endpoint statistics, the access switch endpoint statistics comprise number of addresses aged out, number of addresses relearned, number of rejected address learns, number of dropped broadcast frames, number of dropped multicast frames, and number of dropped frames with unknown destination media access control addresses; and
   client endpoint statistics, the client endpoint statistics comprise asynchronous transfer mode statistics, frame relay statistics, and Ethernet statistics.

13. An aggregation platform for aggregating packets from multiple clients combining connection-oriented and connection-less techniques, the aggregation platform comprising:
   port adaptors connected to one or more client devices;
   an Ethernet port adaptor connected to an access switch;
   forwarding modules connected to the port adaptors and the Ethernet port adaptor, the forwarding modules configured to:
      forward data from the port adaptors to the Ethernet port adaptor utilizing connection-oriented techniques using a layer 2 protocol;
      forward data from the Ethernet port adaptor to the port adaptors utilizing connection-less techniques using a layer 2 protocol to forward data from the access switch to the one or more client devices by looking up destination media access control addresses in a table as data is switched from the Ethernet port adaptor to the port adaptors, matching a destination media access control address in the data to a destination media access control address in the table, the destination media access control address in the table comprises a corresponding virtual circuit, and, if a match is found of the destination media access control address in the data, forwarding data on the corresponding virtual circuit, and, if no match is found of the destination media access control address in the data, flooding or dropping the data responsive to user provisioning;
   wherein the data comprises an Ethernet media access control frame even when the interface type is non-Ethernet; and
   a switch fabric between the one or more client devices and the access switch for performing a multiplex/demultiplex at an access switch connection.

14. The aggregation platform of claim 13, wherein the multiple clients comprise digital subscriber loop access multiplexers and the access switch comprises a broadband remote access switch.

15. The aggregation platform of claim 13, wherein the connection-oriented techniques comprise:
   provisioning a virtual circuit between the port adaptors and the Ethernet port adaptor, the virtual circuit is provisioned for either asynchronous transfer mode on the port adaptors and Ethernet on the Ethernet port adaptor or for Ethernet on the port adaptors and Ethernet on the Ethernet port adaptor;
   learning source media access control addresses with respect to the virtual circuit that sourced the frame as data is switched from the port adaptors to the Ethernet port adaptor, the learned source media access control addresses are stored in the table; and
   forwarding the data in a connection-oriented manner to the virtual circuit.

16. A digital subscriber loop aggregation method for aggregating packets from multiple digital subscriber loop access multiplexers to a single broadband remote access switch combining connection-oriented and connection-less techniques, the packet aggregation method comprising:

provisioning a virtual circuit between ports of the digital subscriber loop access multiplexers and a port of the broadband remote access switch, the virtual circuit is provisioned for either asynchronous transfer mode on the ports of the digital subscriber loop access multiplexers and Ethernet on the port of the broadband remote access switch or for Ethernet on the port of the digital subscriber loop access multiplexers and Ethernet on the port of the broadband remote access switch;

learning source media access control addresses with respect to the virtual circuit that sourced a frame as data is switched from the ports of the digital subscriber loop access multiplexers to the port of the broadband remote access switch, the learned source media access control addresses are stored in a table, and the frame comprises a media access control frame with a source media access control address;

forwarding the data in a connection-oriented manner to the virtual circuit using a layer 2 protocol;

looking up destination media access control addresses in the table as data is switched from the port of the broadband remote access switch to the ports of the digital subscriber loop access multiplexers;

matching a destination media access control address in the data to a destination media access control address in the table, the destination media access control address in the table comprises a corresponding virtual circuit;

if a match is found of the destination media access control address in the data, forwarding data on the corresponding virtual circuit using a layer 2 protocol;

if no match is found of the destination media access control address in the data, flooding or dropping the data responsive to user provisioning; and utilizing an intermediate aggregation platform between the ports of the digital subscriber loop access multiplexers and the port of the broadband remote access switch comprising a switch fabric and performing a multiplex/demultiplex at an broadband remote access switch connection.

17. The digital subscriber loop aggregation method of claim 16, further comprising the steps of:

detecting point-to-point protocol over Ethernet session requests, the session requests comprise any of session establishment, confirmation and termination packets; and inserting a client-specific identifier into the session request, the client specific identifier comprises any of a client's virtual path identifier/virtual channel identifier, data link connection identifier, or virtual local area network identifier.

18. The digital subscriber loop aggregation method of claim 17, wherein the broadband remote access switch is operable to identify a client based upon the client-specific identifier.

\* \* \* \* \*